F. M. JACOB.
AXLE FOR RUNNING GEARS OF WAGONS.
APPLICATION FILED MAY 15, 1919.
1,385,324.
Patented July 19, 1921.
2 SHEETS—SHEET 2.
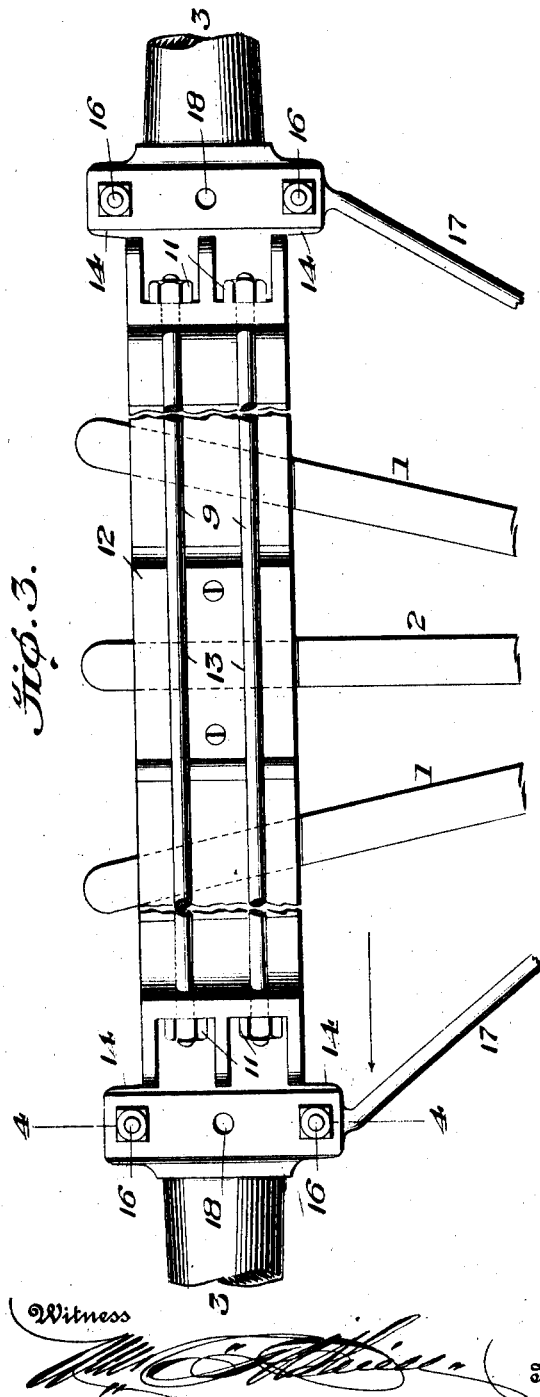
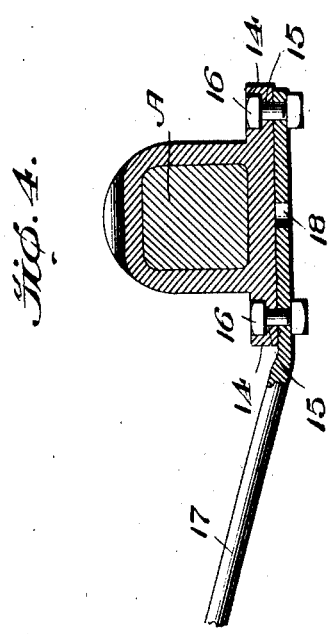

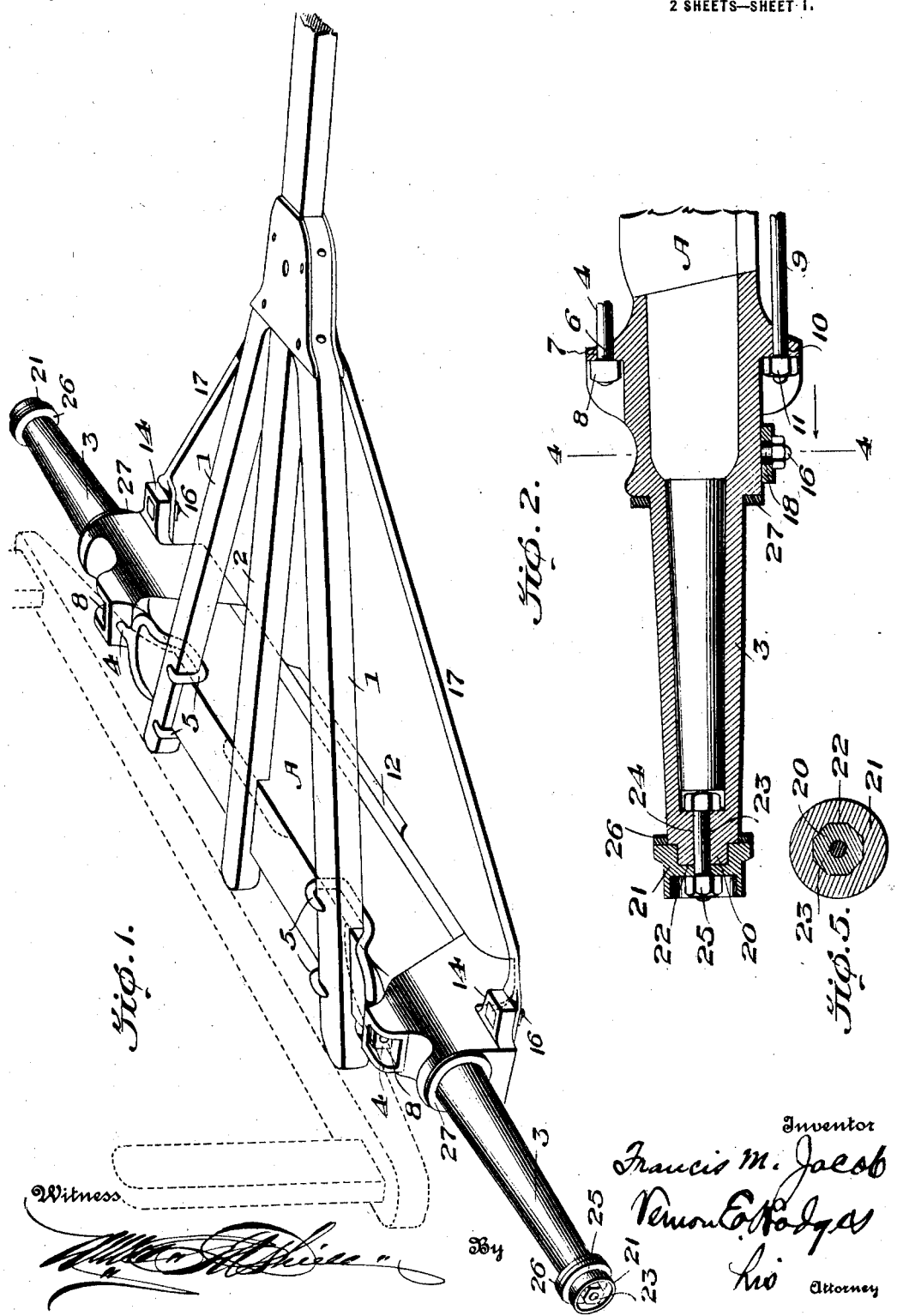

UNITED STATES PATENT OFFICE.

FRANCIS M. JACOB, OF COLUMBUS, MISSISSIPPI.

AXLE FOR RUNNING-GEARS OF WAGONS.

1,385,324.  Specification of Letters Patent. Patented July 19, 1921.

Application filed May 15, 1919. Serial No. 297,245.

*To all whom it may concern:*

Be it known that I, FRANCIS M. JACOB, a citizen of the United States, residing at Columbus, in the county of Lowndes and State of Mississippi, have invented certain new and useful Improvements in Axles for Running-Gears of Wagons, of which following is a specification.

My invention relates to an improvement in axles for the running-gears of wagons.

There are several objects:—first, to provide improved means for securing the skeins on the ends of the axle; second, to provide improved means for attaching the braces which extend from the skeins to the hounds; and third, to provide means for connecting the skeins directly to the hounds, thus holding them securely on the ends of the axle.

In the accompanying drawings:—

Figure 1 is a view in perspective;

Fig. 2 is a vertical longitudinal section;

Fig. 3 is a bottom plan view with parts broken out between the ends and center;

Fig. 4 is a transverse vertical section on the line 4—4 of Figs. 2 and 3, looking toward the center;

Fig. 5 is a detail showing the angular end of the skein which receives the cap.

A, represents the axle; 1, the hounds; and 2, the usual reach which may be adjustably connected with the hounds of the rear axle in the usual manner.

The numeral 3 represents the skein. As the skeins are alike for both ends of the axle, only one need be described in detail. The skein is preferably tapered, and is counterboard to fit the end of the axle; and instead of being held on by a nut as is customary my improved skein is cast with bolt-holes at top and bottom. Bolts 4 have hooked forks 5 at their inner ends to embrace the adjacent hounds and have their threaded ends 6 extended into the holes 7 on top of the skein, and have nuts 8 screwed thereon to draw and hold the upper ends of the skeins securely in place.

A pair of long bolts 9 extend from skein to skein throughout the length of, and beneath, the axle, and through holes 10 in the bottom of the skeins. These bolts have nuts 11 thereon which are screwed up tight to draw the lower ends of the skeins and hold them rigidly in place. A plate 12 having grooves 13 which receive the bolts, is inserted between the bolts and the lower surface of the axle at the center thereof, so that the bolts serve as truss-rods for the support and reinforcement of the axle itself at the center thereof.

Lugs 14 at the bottom extend forward and rearward, and have holes 15 therethrough to receive bolts 16 for securing the rear ends of the braces 17, and these braces extend to the forward ends of the hounds to brace the axle and housing together.

An additional hole 18 is provided at the center which might be utilized to receive a screw in the event of the lugs 14 becoming broken.

The outer ends of the skeins are made angular, preferably in the form of a hexagon 20, and a cap 21 has a correspondingly shaped socket 22 to fit on the end 20 to prevent the cap from turning.

A bolt 23 of any standard type is inserted through a hole 24, and a nut 25 screwed on its threads to hold the cap 21 in place to hold the wheel on the skein.

Washers 26 and 27 are adapted to be placed at either end of the skein to receive the wear from the wheel.

In this way, I have provided an improved skein with means for rigidly securing it in place without having to resort to the ordinary nut at the outer end of the axle; and at the same time I have provided means for effectually preventing the nut on the end of the axle from being accidentally turned off with the back of the wheels, at the same time making it possible to use interchangeable skeins or skeins that are alike either for the right or left hand side of the vehicle.

I claim:

1. The combination with an axle and hounds, of skeins and bolts hooked over the hounds and connected with the skeins for securing the skeins at their tops to the axle.

2. The combination with an axle and hounds, of a skein having lugs thereon and braces extending from the hounds to the lugs, and means for securing them thereto, said skeins having a hole at a point between the lugs adapted to be fashioned to receive a screw or bolt in the event of the lugs being broken.

3. The combination with an axle, of skeins secured on the ends thereof, said skeins having integral lugs, of bolts extending from a lug on one skein to a lug on the other skein, a plate inserted in and substantially filling the space between the axle and bolts, hounds, bolts having hooked forks which engage the hounds and extend through holes in the tops of the skeins and nuts on the ends of said bolts for drawing them up to give the required tension.

In testimony whereof I affix my signature.

FRANCIS M. JACOB.